United States Patent [19]

Heyman et al.

[11] 4,292,511
[45] Sep. 29, 1981

[54] APPARATUS AND METHOD FOR READING AN IDENTIFYING LABEL ON AN INFORMATION RECORD

[75] Inventors: Philip M. Heyman, Robbinsville; David P. Bortfeld, Kendall Park, both of N.J.

[73] Assignee: RCA Corporation, New York, N.Y.

[21] Appl. No.: 142,133

[22] Filed: Apr. 21, 1980

[51] Int. Cl.$^3$ ............................................. G06K 7/00
[52] U.S. Cl. ................................. 235/454; 235/419; 235/464
[58] Field of Search ........................ 235/419, 454, 464

[56] References Cited

U.S. PATENT DOCUMENTS

| | | | |
|---|---|---|---|
| 3,758,753 | 9/1973 | Myer | 235/61.11 E |
| 3,842,194 | 10/1974 | Clemens | 178/6.6 A |
| 3,864,548 | 2/1975 | O'Neil | 235/61.11 E |
| 4,097,895 | 6/1978 | Spong | 358/128 |

Primary Examiner—Harold I. Pitts
Attorney, Agent, or Firm—Birgit E. Morris; William J. Burke

[57] ABSTRACT

An apparatus and method for reading an identifying label on an information record where the label consists of alternating regions of the record surface having different surface effects. The apparatus comprises a light source, collimating optics, focusing optics to focus a portion of the light beam scattered from the record surface on a multi-element light detector whose elements are successively read out to form a serial electrical signal representative of the label, and electrical means for reading out the detected light signal. The apparatus has sufficient sensitivity and accuracy to read out a black-on-black label.

9 Claims, 4 Drawing Figures

APPARATUS AND METHOD FOR READING AN IDENTIFYING LABEL ON AN INFORMATION RECORD

The invention relates to an apparatus and a method for reading an identifying label and, more particularly, to an apparatus and method for reading a label identifying program material on an information record.

BACKGROUND OF THE INVENTION

An information record may be, for example, a record blank in which information may be recorded, an optical video disc where information is recorded by ablation of a coating thereon or by embossing a relief pattern into the disc surface or it may be a capacitance type video disc wherein variations in capacitance between an electrode incorporated in a groove riding stylus and a conductive property of the disc are sensed to reproduce the stored information. A capacitance type video disc system has been disclosed by Clemens, U.S. Pat. No. 3,842,194 issued Oct. 15, 1974. An optical video disc system has been disclosed by Spong in U.S. Pat. No. 4,097,895 issued June 27, 1978.

For such information records, it is often beneficial to enclose the information record in a protective caddy to provide a dust free environment for the record and to deter indiscriminate access to the record. Coleman et al have disclosed a protective caddy and video disc record combination in U.S. Pat. application Ser. No. 98,412 filed Nov. 28, 1979. In the Coleman system the user does not remove, or is at least discouraged from removing, the information record from the caddy. Information with respect to program material on one side of the disc vis-a-vis the other side is generally printed on the outside surfaces of the caddy and the information record is not in general removed from the caddy by the user outside of the information record playing apparatus. Since the user does not remove the information record from the caddy there is no need to provide a user readable label on the information record. However, it is desirable to encode the information record so that the information record and caddy may be matched during the manufacturing process without playback of the information record to determine the information stored thereon.

One of the primary purposes of the protective caddy is to provide a clean environment for the information record stored therein. Thus, it is not desirable to use a label of some foreign material such as paper or paint which may flake off inside the protective caddy thereby producing debris on the surface of the information record.

Roach in an application entitled "Grooved Label For Video Disc," Ser. No. 142,852, filed Apr. 21, 1980, and incorporated herein by reference, has disclosed a label for video disc records wherein a surface of the disc is provided with a surface affect which is readable by optical means and which is stamped into the disc surface during the stamping operation, thus eliminating any additional manufacturing steps or cost for labeling the record.

SUMMARY OF THE INVENTION

The invention is an apparatus and method for reading an identifying label on an information record. The label comprises an annular area of the surface of the information record having first surface regions which have a circular surface affect for scattering light in a first direction and second surface regions which have a circular surface affect for scattering light away from the first direction. The arrangement of the first surface regions with respect to the arrangement of the second surface regions is representative of the identity of the information stored on the record. The apparatus comprises a light source; a collimating optical system for providing a partially collimated light beam to illuminate a portion of the annular area of the information record; means for positioning the information record to receive and scatter the illuminating light beam; a focusing optical system for collecting the light beam scattered from a portion of the annular area information record and focusing the collected light beam onto a light sensitive detector; and a light sensitive detector having a multiplicity of light sensitive elements and positioned for detecting light scattered from either the first or second regions of the annular area of the information record. Light scattered in the first direction from successive regions of the label is focused on one or more successive elements of the detector and detected therein. Electrical means are provided whereby the detected light signal is converted into a serial electrical signal representative of the identifying label on the information record.

DETAILED DESCRIPTION OF THE INVENTION

Figure 1:
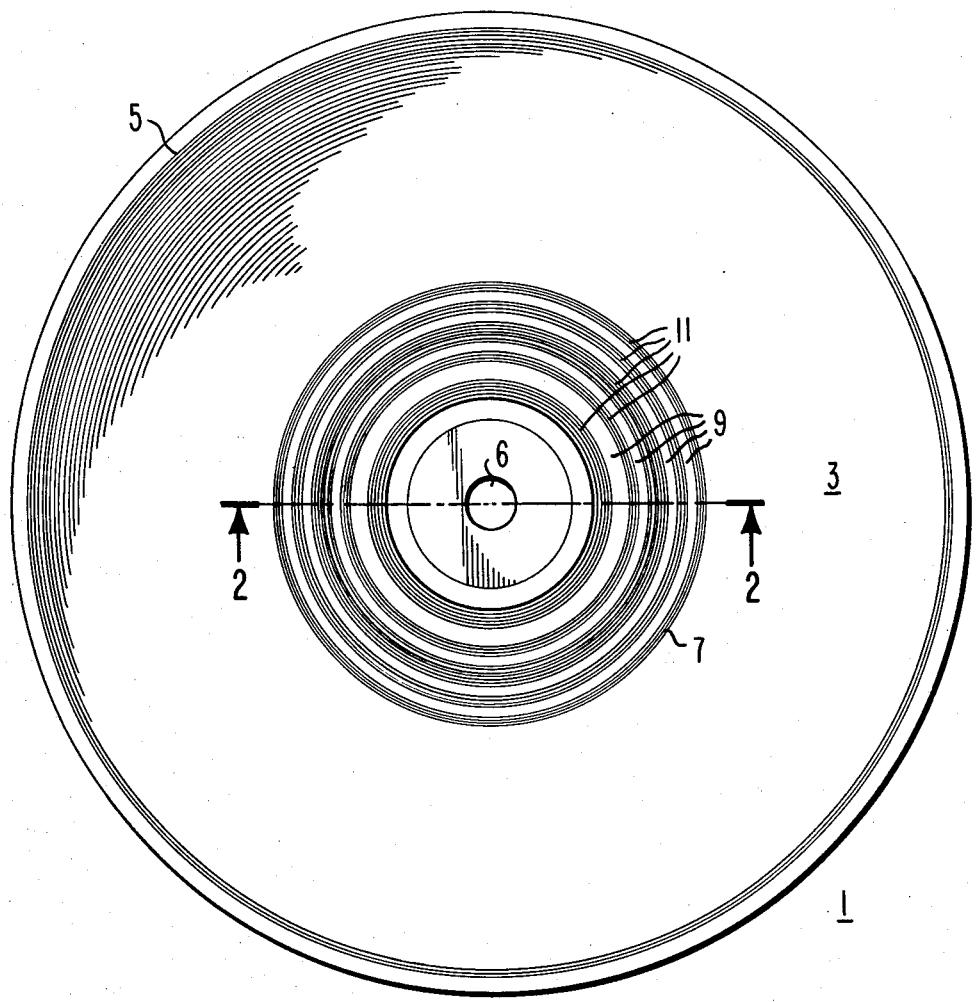
FIG. 1 illustrates a top view of an information record having a grooved label.
Figure 2:
FIG. 2 illustrates a cross-sectional view of the section 2—2 of FIG. 1.

Referring to FIGS. 1 and 2, the information record 1, which may be formed of a conductive plastic material, such as carbon in a polyvinyl chloride base, has an area 3 including a spiral information track 5. The record 1 may have a central opening 6 therethrough by which the record may be mounted on a spindle on an information record player. An annular area 7 on the surface of the disc of the information record 1 comprises first surface regions 9 which alternate with second surface regions 11. The first surface regions 9 may be a smooth, specular surface. Alternatively these regions may be provided with a surface effect such as a spiral groove having a pitch of about 400 grooves per centimeter such as that disclosed by John et al. in an application entitled "Variable Pitch Grooved Label For Video Disc", Ser. No. 146,855, filed Apr. 21, 1980, and incorporated herein by reference. The second surface regions 11 are provided with a circular surface affect such as a V-shaped, spiral groove of 110° included angle with a pitch of approximately 3200 grooves per centimeter.

The label which is coded by the varying widths in the arrangement of surface regions 9 and 11 in the annular area 7 may be formed by machining sets of fine grooves into a metal substrate during the information record manufacturing process. A stamper disc may be derived from the metal substrate, as disclosed by Clemens, and utilized to produce a plurality of replicated information records, each information record having the same fine grooved pattern which appears in the metal substrate.

Figure 3:
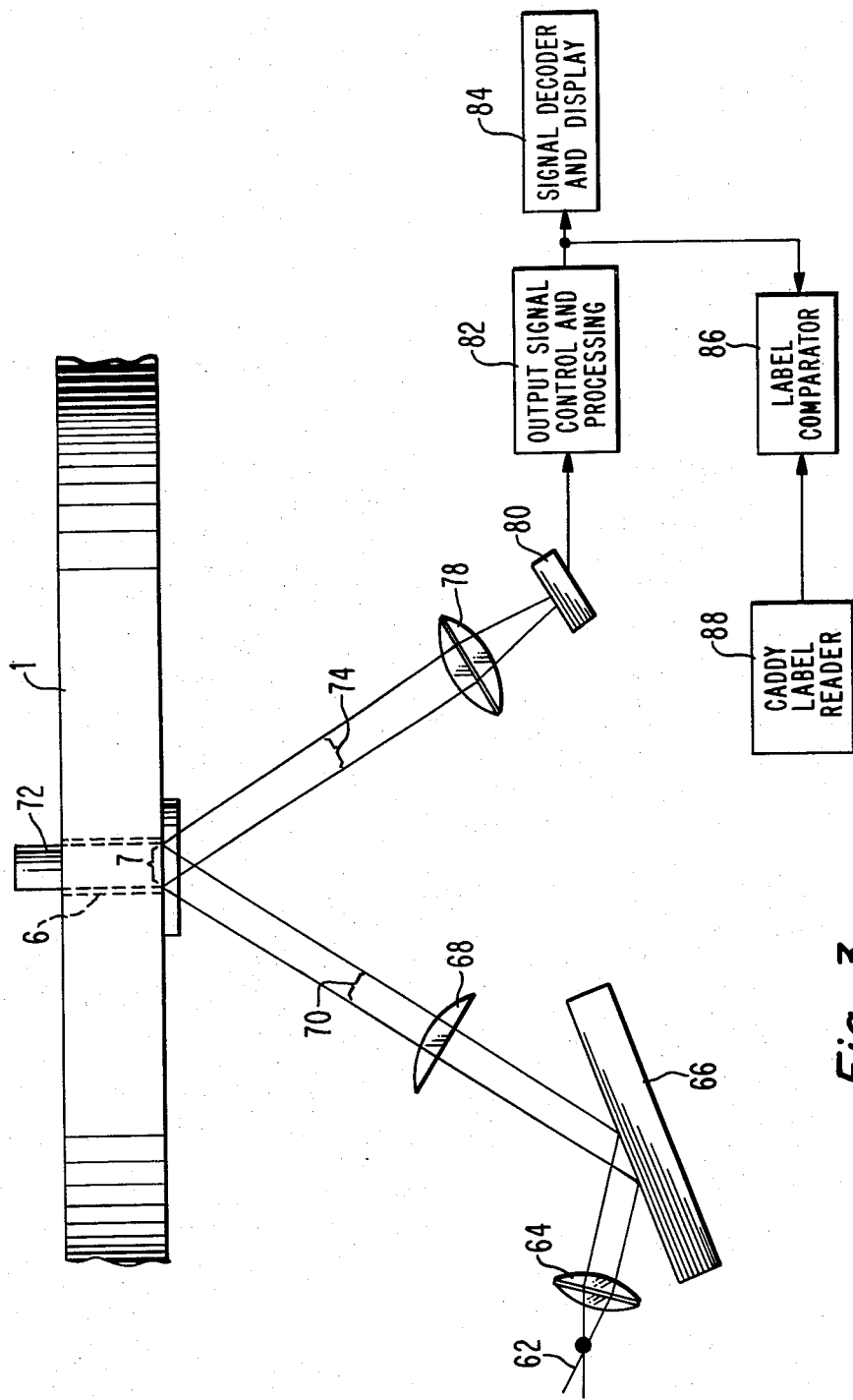
FIG. 3 is a schematic illustration of a cross-sectional view of the apparatus of the invention for reading an identifying label.
Figure 4:
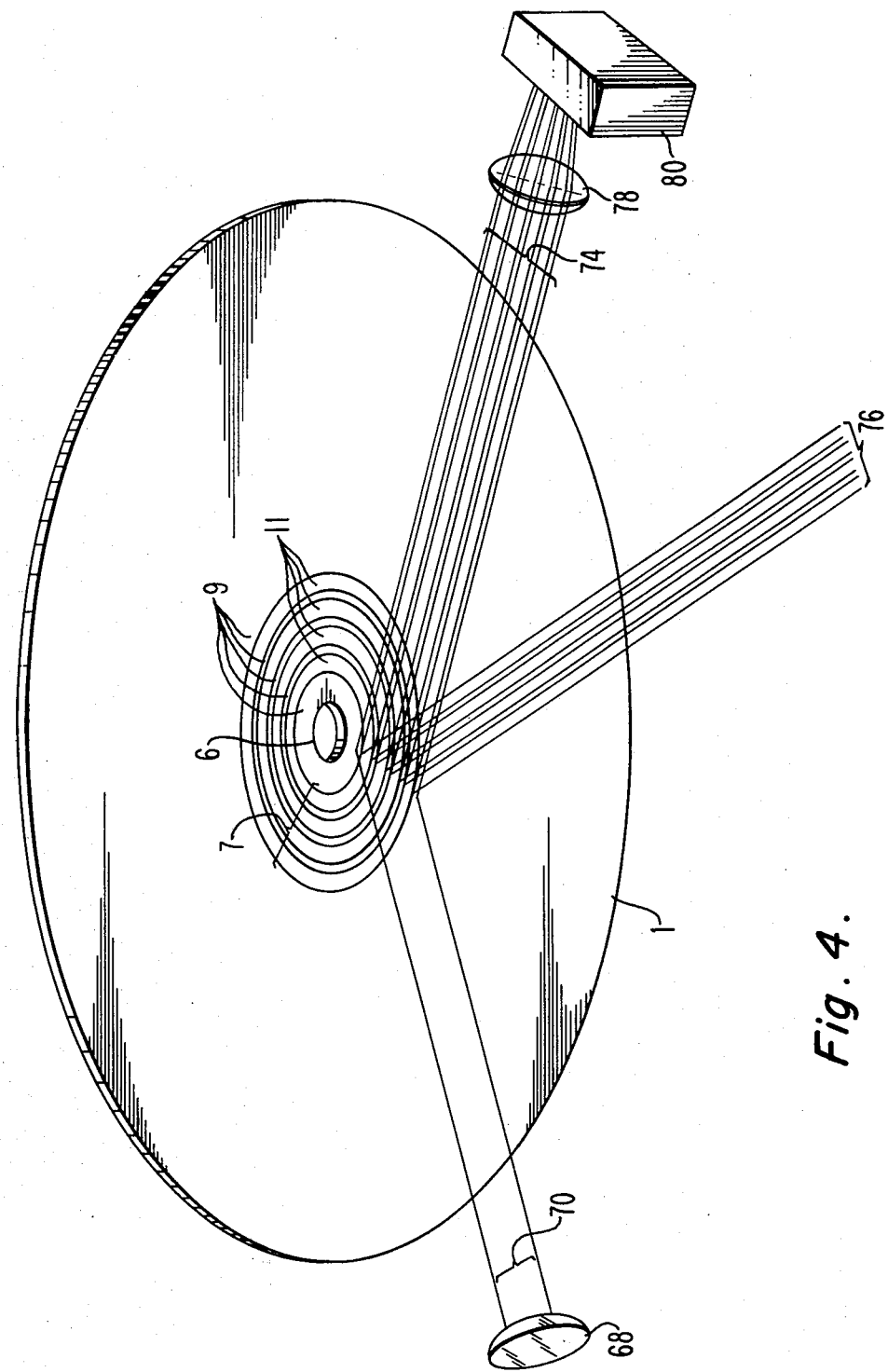
FIG. 4 is a schematic illustration of a plan view of the information record and light beams showing the orientation of the surface regions and the light beams.

Referring to FIGS. 3 and 4, wherein the identification of the parts of the information record correspond to those of FIG. 1, the apparatus 60 of the invention is shown. The emission of a light source 62 is collected and collimated, depending upon system design, by collimating optics 64 which comprise one or more lens or mirrors or combinations thereof. The choice of the focal length of the collimating optics 64 depends upon several factors including the light source used, the diameter of the illumination beam desired and the degree of collimation desired. The light source 62 may, for example, be a tungsten filament lamp, a strobe flash lamp, a laser or a light emitting diode.

The light beam thus formed may be limited in its wavelength content by the use of a filter such as a mirror 66, known as a cold mirror, which is reflective of light over a limited portion of the wavelength spectrum with the remainder of the wavelength spectrum transmitted by the mirror and thus not used. Alternatively, with a repositioning of the light source 62 and the collimating optics 64, a transmission filter which is transmissive of light over only a limited portion of the wavelength spectrum may be used. The utility of such a mirror or transmission filter is that a portion of the light source emission, in particular the infrared light, is not incident on the information record. This is particularly useful in that the information record is typically black and thus highly absorbing of the infrared light.

An additional focusing element 68 such as a lens may also be used to provide further collimation of the light beam on the annular area 7 of the information record. The light source 62, the collimating optics 64, the mirror 66 and the focusing element 68 may all be fixed in position and need not move during the label reading.

The incident light beam 70 thus formed by the collimating optics is then partially collimated and has a cross-sectional area sufficient to illuminate a portion of the annular area 7 including all elements of the label in a radial direction on the surface of the information record. Preferably, the intensity of the beam is substantially uniform over its cross-section.

The information record 1 is held in a position such that the incident light beam 70 intercepts a portion of the annular surface 7 by positioning means such as a spindle 72 which is inserted into the central opening 6 of the information record 1. Alternatively, the information record 1 could be held by its periphery.

Preferably, the incident light beam 70 intercepts the annular area 7 of the information record 1 in a propagation direction whose projection onto the surface plane of the information record is tangential to the circular surface effect as shown schematically in FIG. 4. Alternatively, the light beam 70 may be incident in a direction other than that having its projection on the information record surface tangential to the circular surface regions; for example, perpendicular to the circular surface regions. Directions other than the tangential one are not preferred, however, beause of difficulty in maintaining focus over all the elements of the light detector.

The incident light beam 70 need only intercept a radial portion of the annular area which includes an arc section of each of the first and second surface regions which comprise the label. The light beam need not intercept the entire annular area containing the label.

The portion of the light beam which strikes the first surface regions 9 is scattered by the record surface in a first direction forming the light beam designated 74. If the first surface regions 9 are predominately planar and smooth, this direction will be the direction of specular reflection of light from the surface. Light which strikes the second surface regions 11 is scattered by the second surface regions in a direction or directions different from the first direction thus forming the light beam designated 76. If the second surface regions 11 comprise grooves embossed in the record surface, as described above, the light incident on these regions will be diffracted in a direction different from the first, or a specular direction.

The diffracted light beam 76 is shown in FIG. 4 for the sake of clarity where it is understood that the diffracted beam 76 shown is propagating in a direction out of the plane formed by the incident and specularly reflected beams.

It is further understood that if diffraction is the scattering mechanism a third beam (not shown) is formed which is scattered from the surface at the same angle to, and to the other side of, the incident beam. For a light beam wavelength of 600 nanometers and a groove spacing of 2.5 micrometers the angle between the zeroth (specular direction) order and the first diffraction order will be about 13°. For symmetrical groove having an angle of about 110° a large portion of the light incident on the second surface regions 11 is diffracted into the second and third diffraction orders. Thus, a large angle of separation between the light scattered from the first and second regions of the annular surface 7 can be obtained.

Alternatively, the second surface regions 11 may have, for example, a matte finish which would produce diffuse scattering rather than a diffraction effect.

The first surface regions alternatively may comprise a spiral groove having a pitch much larger than that of the second surface regions. Light incident on these regions will also be diffracted but at an angle from the specular direction which is much smaller than the diffraction angle from the second surface regions. In this embodiment the first surface region is still regarded as a substantially specular region. About 70% of the incident light is specularly reflected from the remaining unperturbed portion of this region. The light scattered by the grooves can be looked upon as reducing the signal to noise if the scattering angle throws that light outside the acceptance cone for the specular light.

It is to be understood that if a white light illumination source is used the diffraction angle will differ for each wavelength thus producing scattering over a broad range of angles. The angular separation between the light scattered from the first and second regions is, however, sufficiently great to differentiate between the specular and diffracted components of the light beam.

The light beams 74 and 76 as scattered from the surface of the record contain intensity variations representative of the information coded on the identifying label and can then be imaged onto a light detector. Preferably, the light beam 74 is used since it remains at least partially collimated after scattering and does not suffer from the chromatic distortions which would be present in a diffracted light beam comprising a broad band of wavelengths.

Referring to FIGS. 3 and 4, the light beam 74 is focused, using focusing optics 78, comprising one or more lenses or mirrors, on a light sensitive detector 80. Both the focusing optics 78 and the light sensitive detector 80 may be fixed in position and need not move during the label reading process. The light sensitive detector 80 is a linear array of light sensitive elements so positioned that the array of elements lies approximately perpendicular to the plane formed by the optic axes of the incident light beam 70 and the scattered light beam 74 and approximately perpendicular to the direction of propagation of the scattered light beam 74. For a different orientation of the incident and scattered light beams a different detector orientation may be required.

The use of a multi-element detector array permits the simultaneous detection of the light scattered from all the elements of the array without mechanical scanning of the label.

The identifying label consists of a series of digits, typically ten, each of which is encoded as a sequence of wide and narrow first surface regions or second surface regions or combinations thereof. One such encoding scheme is the interleaved two-of-five code in which two of the five first surface regions are wide and three are narrow corresponding to a first digit and two of five second surface regions are wide and three are narrow corresponding to a second digit. Thus for a label comprising grooved and non-grooved regions there are two grooved and two non-grooved wide regions and three grooved and three non-grooved narrow regions. Each wide region may be three times the width of a narrow region. Each narrow region is a module and, in the above case, eighteen such modules represent two digits in the interleaved two-of-five code with ninety modules thus required for coding ten digits. A minimum of one light sensitive element is required for each module of this code plus additional elements for the start and the stop modules which indicate the beginning and end of the code. A larger number of elements per module is preferred to guard against defective elements and response variations from element to element. We have found that the use of seven elements per module provides the desired redundancy. A suitable light sensitive detector, the elements of which can be sequentially scanned, is the Reticon image sensor having 1024 elements which is manufactured by EG & G Corporation, Sunnyvale, Calif. A detector having such an excess of elements is desirable since small displacements of the image due to a mispositioning of the information record results only in a translation of the image along the array of elements.

The light sensitive detector 80 is controlled by the electrical means 82 which provides output signal control and processing. The control and processing functions include electrical biasing of the detector elements, clocking and serial readout of the elements of the array, automatic gain control to compensate for fluctuations in the average amount of light falling on the entire array, and a clipping function which provides a two-level output for each element depending upon whether the element is illuminated or not. Such electrical means are well known to one skilled in the art and may be purchased, for example, from the EG & G Corporation, Sunnyvale, Calif.

The signal decoder and display 84 includes electrical circuitry for decoding the output of the electrical means 82 according to the particular labeling code and circuitry to convert the decoded signal into a form which can be used in driving a display, such as a ten digit LED display. The display exhibits the digits originally encoded onto the information record.

The electrical output signal of the electrical means 82 may also be fed into a label comparator 86 which compares this electrical signal with the electrical signal generated by a caddy label reader 88 to determine whether the identifying label on the information record agrees with that on the caddy. A suitable label comparator is the Identicon series 628 manufactured by the Identicon Corporation, Franklin, Mass. The caddy is typically labeled using a standard printed product code. Suitable readers for such printed codes are commercially available.

An apparatus was constructed according to the description above. The specular component of the scattered light was detected. The outputs of the light detector elements were read out sequentially at a 25 Hz clock rate. Using the clocking period as an integration time a signal to noise ratio of about 10 to 1 and a contrast ratio of about 20 to 1 between the grooved and specular regions were obtained. These results were sufficient to provide an accurate identification of the label and demonstrate the utility of this method for reading what is essentially a black-on-black label using a white light source.

This apparatus provides a simple, compact optical reader which can have no moving parts and simultaneously detects all parts of the label with the sensitivity to read a black-on-black label using specularly reflected light only. In contrast, other label readers provide a mechanical scan, with its attendant complexity and reliability problems, of the illuminating or scattered light beams to read such a label.

The identifying label for an information record described above can be read using apparatus such as that described herein. The method of reading the label comprises the steps of:

(a) mounting an information record having an identifying label thereon on positioning means such as a spindle;

(b) illuminating a radial portion of the annular area of the information record having components of each of the first and second surface regions therein with a light beam;

(c) collecting and focusing the light beam scattered from the annular area in a first direction onto a light sensitive detector having a multiplicity of light sensitive elements wherein light scattered from successive regions of the label are focused on successive elements of the light detector and simultaneously detected therein; and (d) converting the detected light beam into a serial electrical signal representative of the identifying label on the information record.

The method may also include the additional steps of:

(e) reading an identifying label on an information record caddy and generating an electrical signal representative of the label on the information record caddy; and (f) comparing the electrical signal representative of the label on the information record with the electrical signal representative of the label on the information record caddy.

In this way, the match between the caddy and the information record can be confirmed before the information record is inserted in the caddy.

We claim:

1. Apparatus for reading an identifying label on an information record, wherein the label comprises an annular area of the surface of the information record having first surface regions which have a circular surface effect for scattering light in a first direction and second surface regions which have a circular surface effect for scattering light substantially away from the first direction wherein the arrangement of the first surface regions with respect to the arrangement of the second surface regions is representative of the identity of the information signal stored in the annular area, which apparatus comprises:

- a light source;
- a collimating optical system for collecting and partially collimating a light beam emitted by the light source for illumination of a radial portion of the annular area;
- means for positioning the information record to receive and scatter the light beam;
- a focusing optical system for collecting that portion of the light beam scattered in a first direction from the annular area and focusing the collected light beam onto a light sensitive detector;
- a light sensitive detector having a multiplicity of light sensitive elements and positioned for simultaneously detecting light scattered from the area of the information record having the label thereon wherein light scattered from successive regions of the label are focused on successive elements of the light detector and detected therein; and
- electrical means whereby the detected light is converted into a serial electrical signal representative of the identifying label on the information record.

2. An apparatus according to claim 1 wherein a filter which passes a band of wavelengths and which does not pass light of other wavelengths is interposed between the light source and the information record.

3. An apparatus according to claim 2 wherein said collimating optical system is a lens.

4. An apparatus according to claim 3 wherein said focusing optical system is a lens.

5. An apparatus according to claim 4 having means for reading an identifying label on an information record caddy and generating an electrical signal representative of the label on the information record caddy; and
- electrical means for comparing the electrical signal representative of the label on the information record with the electrical signal representative of the label on the information record caddy.

6. An apparatus according to claim 1 wherein said electrical means include electrical circuitry for elecrical biasing of the detector elements, clocking and serial readout of the detector elements and automatic gain control of the detector element output.

7. A method for reading an identifying label on an information record, wherein the label comprises an annular area of the surface of the information record having first surface regions which have a circular surface effect for scattering light in a first direction and second surface regions which have a circular surface effect for scattering light substantially away from the first direction wherein the arrangement of the first surface regions with respect to the arrangement of the second surface regions is representative of the identity of the information signal stored in the annular area, which method comprises the steps of:

(a) mounting an information record having the identifying label thereon on positioning means;
(b) illuminating a radial portion of the annular area of the information record having components of each of the first and second surface regions therein with a light beam;
(c) collecting and focusing the light beam scattered from the annular area in a first direction onto a light sensitive detector having a multiplicity of light sensitive elements wherein light scattered from successive regions of the label are focused on successive elements of the light detector and simultaneously detected therein; and
(d) converting the detected light beam into a serial electrical signal representative of the identifying label on the information record.

8. A method according to claim 7 wherein the information recorded is so mounted and the illuminating light beam propagates in such a direction that the projection of the light beam propagation direction on the annular area is tangential to the circular surface effect.

9. A method according to claim 7 including the additional steps of:

(e) reading an identifying label on an information record caddy and generating an electrical signal representative of the label on the information record caddy; and
(f) comparing the electrical signal representative of the label on the information record with the electrical signal representative of the label on the information record caddy.

* * * * *